(No Model.)
S. McMULLIN.
BICYCLE GEARING.
No. 591,488.  Patented Oct. 12, 1897.
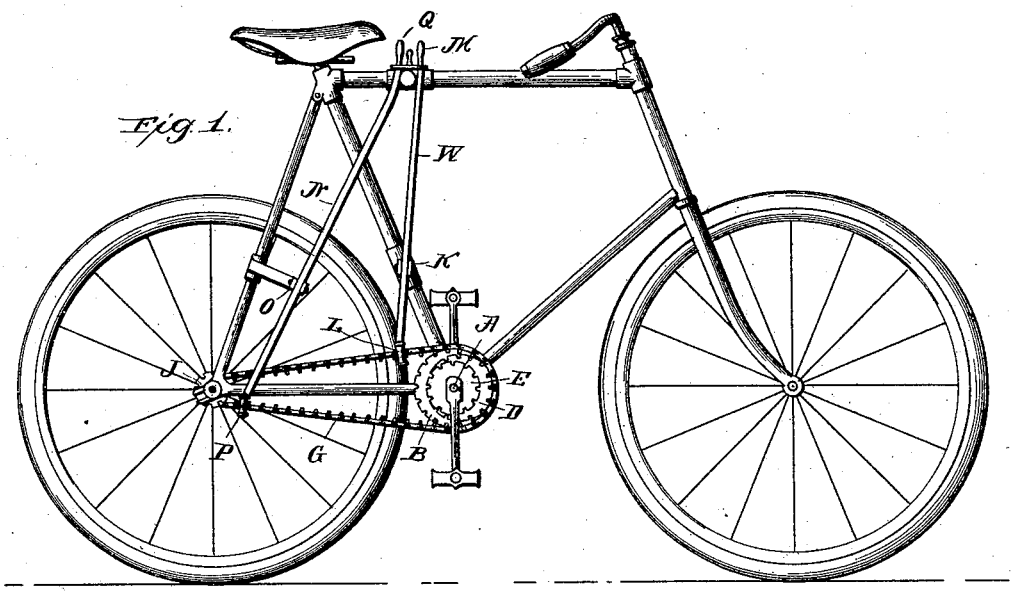
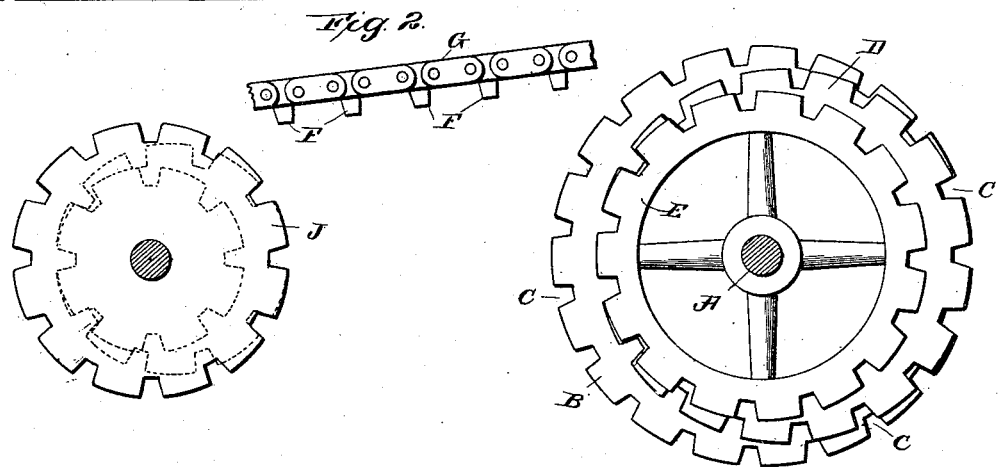
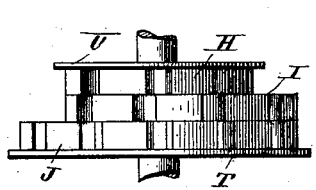
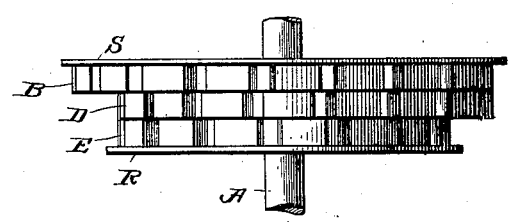
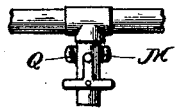
Witnesses
E. C. Wurdeman
J. S. Williamson
Inventor
Samuel McMullin
by Geo. H. Holgate
Attorney
THE NORRIS PETERS CO., PHOTO-LITHO., WASHINGTON, D. C.

UNITED STATES PATENT OFFICE.

SAMUEL McMULLIN, OF PHILADELPHIA, PENNSYLVANIA.

BICYCLE-GEARING.

SPECIFICATION forming part of Letters Patent No. 591,488, dated October 12, 1897.

Application filed September 14, 1896. Serial No. 605,744. (No model.)

*To all whom it may concern:*

Be it known that I, SAMUEL McMULLIN, a citizen of the United States, residing at Philadelphia, in the county of Philadelphia and State of Pennsylvania, have invented a certain new and useful Improvement in Bicycle-Gearing, of which the following is a specification.

My invention relates to a new and useful improvement in bicycle-gearing, and has for its object to provide a device of this description by means of which the speed of a bicycle may be changed, thereby increasing or decreasing the power required to propel the machine, and a further object of my invention is to permit the changing of the speed without the dismounting of the rider; and with these ends in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 1 is a side elevation of a bicycle having my improvement applied thereto; Fig. 2, a diagrammatical view of the front and rear sprockets with a section of chain in conjunction therewith; Fig. 3, a plan view of these sprockets; and Fig. 4 is a top plan view of a section of the frame, showing the levers applied thereto.

In carrying out my invention I secure upon the crank-axle A a sprocket-wheel B, in which notches C are formed, for the purpose hereinafter set forth, and next adjacent to this wheel is secured an eccentric sprocket-wheel D, so arranged relative to the first-named wheel that a portion of its periphery lies in the same plane as the periphery of the first-named wheel, and next to this eccentric sprocket-wheel is secured a sprocket-wheel E of smaller diameter than the sprocket-wheel B, a portion of the periphery of the eccentric wheel lying in the same plane with a portion of the periphery of the smaller sprocket-wheel, as clearly shown in Fig. 2. Both the eccentric wheel and the wheel E have notches formed therein similar to the notches C, and these notches are for the reception of the lugs F, formed upon the links of the chain G, so that when the chain passes around either of the pulleys these lugs will project into engagement with the notches, thereby enabling the wheel to transmit power through said chain.

Upon the hub of the rear wheel of the bicycle is secured a sprocket-wheel H, having notches therein, and next to this sprocket-wheel is secured an eccentric sprocket-wheel I, which in turn has secured adjacent thereto the sprocket-wheel J of larger diameter than the sprocket-wheel H, and the eccentric sprocket-wheel is so placed relative to these two wheels that a portion of its periphery coincides with a portion of each of the peripheries of the first-named wheels.

In practice the sprocket-wheel J upon the hub of the rear wheel, which is largest in diameter of that set, is arranged in line with the sprocket-wheel E, which is the smallest in the set upon the crank-axle, thus causing the wheel H to fall in line with the wheel B, and these wheels are of such a diameter relative to each other that the chain will be equally taut when running upon the wheels B and H or upon the wheels E and J. Now it is obvious that should a pressure be brought to bear upon one side of the chain when it is running upon one pair of the wheels it will be so shifted as to pass, by means of the eccentric wheels, to the other pair of wheels, and in order that this changing of the chain may be facilitated it is preferable that when changing from a lower to a higher speed the chain shall be first shifted from the sprocket-wheel J to the sprocket-wheel H, which will slacken the same, and thereafter it is readily shifted from the sprocket-wheel E to the sprocket-wheel B without injury. A reverse movement is had when shifting to a lower speed, which consists in first shifting the chain from the sprocket-wheel B to the sprocket-wheel E, and then shifting the rear portion thereof from the sprocket-wheel H to the sprocket-wheel J, the eccentric wheels always serving as "riders" for carrying the chain to the proper level for it to pass onto the desired wheel.

In order to bring about the shifting of the chain, a lever W is pivoted at K to the frame of the bicycle and has a loop L at the bottom thereof which embraces the chain, and the upper end of this lever is provided with a handle M for convenience of operation. A similar lever N is pivoted at O and provided with a loop P, which embraces the lower strand of the chain near the rear hub, and is also provided with a handle Q for its operation, so that when the rider is mounted upon the bicycle these handles will be in convenient reach and it will be only necessary to bring about the proper movements of the chain, as before described, by the proper manipulation of said handles, after the manner of shifting a belt, the lugs F readily riding out of one series of notches into another, and to prevent the running of the chain from off the end wheels flanges R and S are formed upon the front set, while the flanges T and U are formed upon the rear set, as clearly shown.

While each set of wheels may be formed of separate wheels secured upon a common axle, it is obvious that each set may be formed integrally, and for some purposes this construction is preferable.

By the use of my improvement power may be gained at the expense of speed or speed at the expense of power, so that when it becomes necessary to drive the machine up a grade or over a rough road-bed the speed thereof relative to the movements of the crank may be reduced by the proper shifting of the chain, and when but little resistance is offered to the forward progression of the machine, as when running over a smooth level road-bed, the chain may be so shifted as to greatly increase the speed with a given number of revolutions of the crank-shaft, and this without the necessity of the rider dismounting.

Having thus fully described my invention, what I claim as new and useful is—

1. A bicycle-gearing, consisting of two sets of sprocket-wheels, each set having two concentric wheels of different diameters and an eccentric wheel interposed therebetween, said eccentric wheel adapted to act as a rider, and the chain which may be shifted from one wheel to the other, as specified.

2. A bicycle-gearing, consisting of two sets of wheels, each set composed of two concentric sprocket-wheels and an eccentric sprocket-wheel interposed therebetween, the periphery of the last-named wheel lying tangentially to both of the first-named wheels, a series of notches formed in the wheels, and a chain having projections for engagement with said notches, as specified.

3. The herein-described combination of two sets of wheels, one carried by the crank-shaft of a bicycle and the other by the hub of the rear wheel of said machine, each set being composed of two concentric wheels of different diameters, said wheels being arranged reversely relative to the wheels of the other set and an eccentric wheel interposed between the wheels of each set and so disposed that its periphery passes into the same plane as the peripheries of the concentric wheels, notches formed in said wheels, a chain composed of links adapted to pass around the wheels, and lugs formed with the links of the chain for engagement with the notches in the wheels, substantially as and for the purpose set forth.

In testimony whereof I have hereunto affixed my signature in the presence of two subscribing witnesses.

SAMUEL McMULLIN.

Witnesses:
S. S. WILLIAMSON,
MARK BUFORD.